(12) United States Patent
Zeidan

(10) Patent No.: US 8,408,802 B2
(45) Date of Patent: Apr. 2, 2013

(54) BI-DIRECTIONAL ROTATION OFFSET PIVOT THRUST BEARING

(75) Inventor: Fouad Y. Zeidan, Pearland, TX (US)

(73) Assignee: Waukesha Bearings Corporation, Pewaukee, WI (US)

( * ) Notice: Subject to any disclaimer, the term of this patent is extended or adjusted under 35 U.S.C. 154(b) by 269 days.

(21) Appl. No.: 12/793,983

(22) Filed: Jun. 4, 2010

(65) Prior Publication Data

US 2010/0310201 A1   Dec. 9, 2010

Related U.S. Application Data

(60) Provisional application No. 61/217,989, filed on Jun. 8, 2009.

(51) Int. Cl.
*F16C 17/04* (2006.01)

(52) U.S. Cl. ........ 384/308; 384/122; 384/306; 384/312; 384/420

(58) Field of Classification Search ............... 384/122, 384/125, 224, 304–305, 308–309, 312, 368, 384/420, 306
See application file for complete search history.

(56) References Cited

U.S. PATENT DOCUMENTS

| | | | |
|---|---|---|---|
| 1,541,411 A | | 6/1925 | Davis |
| 2,744,799 A | * | 5/1956 | Howarth ................... 384/308 |
| 3,512,854 A | * | 5/1970 | Harbage, Jr. ............... 384/308 |
| 3,837,178 A | | 9/1974 | Hackforth et al. |
| 3,859,868 A | | 1/1975 | Post |
| 3,909,587 A | | 9/1975 | Mattis |
| 4,026,613 A | * | 5/1977 | Moravchik .................. 384/308 |
| 4,103,979 A | | 8/1978 | Kuhn |
| 4,288,128 A | | 9/1981 | Wells |
| 4,335,925 A | * | 6/1982 | Stopp ........................ 384/309 |
| 4,421,426 A | * | 12/1983 | Furukawa .................. 384/224 |
| 4,456,391 A | | 6/1984 | New |
| 4,515,486 A | | 5/1985 | Ide |
| 4,738,550 A | | 4/1988 | Gardner |
| 5,007,745 A | | 4/1991 | Ball et al. |
| 5,012,694 A | | 5/1991 | McGrath |
| 5,068,965 A | | 12/1991 | Ball et al. |

(Continued)

FOREIGN PATENT DOCUMENTS

| | | | |
|---|---|---|---|
| EP | 1927769 A2 | * | 6/2008 |
| EP | 2060805 A1 | * | 5/2009 |

(Continued)

OTHER PUBLICATIONS

C. Ettles, "The Development of a Generalized Computer Analysis for Sector Shaped Tilting Pad Thrust Bearings", Tribology Transactions, vol. 19 Issue 2, Apr. 1976, pp. 153-163.

*Primary Examiner* — Marcus Charles
(74) *Attorney, Agent, or Firm* — Hamilton IP Law, PC; Jay R. Hamilton; Charles A. Damschen

(57) ABSTRACT

The bi-directional rotation offset pivot thrust bearing includes a carrier and an array of longitudinal protrusions thereon that run through the center axis of the carrier. An array of pads are in slidable engagement with the longitudinal protrusions to permit the thrusts pads to move between first and second rotational positions. The thrust pads are automatically offset pivoted in a first direction when in a the first rotational position and automatically offset pivoted in a second direction when in the second rotational position. The thrust pads are offset pivoted in an approximate 60 percent to 40 percent ratio with the leading side of the thrust pad being 60 percent in both the first rotational position and the second rotational position. A retainer is also provided to maintain the thrust pads in slidable communication with the protrusions.

15 Claims, 8 Drawing Sheets

U.S. PATENT DOCUMENTS

| | | |
|---|---|---|
| 5,124,605 A | 6/1992 | Bitterly et al. |
| 5,137,373 A | 8/1992 | Ide |
| 5,156,379 A | 10/1992 | Tabata |
| 5,353,640 A | 10/1994 | Jiang et al. |
| 5,372,431 A | 12/1994 | Ide |
| 5,415,061 A | 5/1995 | Kohno |
| 5,498,082 A | 3/1996 | Nadjafl |
| 5,549,392 A | 8/1996 | Anderson |
| 5,556,208 A | 9/1996 | Ide |
| 5,567,057 A * | 10/1996 | Boller ............ 384/308 |
| 5,743,654 A | 4/1998 | Ide et al. |
| 5,772,335 A | 6/1998 | Miller |
| 5,795,076 A | 8/1998 | Ball et al. |
| 5,816,114 A | 10/1998 | Gregoire et al. |
| 5,879,085 A | 3/1999 | Ball et al. |
| 5,954,480 A | 9/1999 | Schmaling et al. |
| 6,079,102 A | 6/2000 | Miller |
| 6,170,989 B1 | 1/2001 | Zeidan |
| 6,183,138 B1 | 2/2001 | New |
| 6,200,034 B1 | 3/2001 | Miller |
| 6,379,046 B1 | 4/2002 | Zeidan |
| 6,443,621 B1 | 9/2002 | New |
| 6,499,883 B2 | 12/2002 | Miller |
| 6,565,257 B1 * | 5/2003 | Kennedy et al. ........ 384/122 |
| 6,739,756 B2 | 5/2004 | Miller |
| 6,746,152 B2 * | 6/2004 | Branagan ............ 384/122 |
| 7,163,368 B2 | 1/2007 | Ide et al. |
| 7,275,872 B2 | 10/2007 | Abrahamian |
| 7,311,445 B2 | 12/2007 | New |
| 7,367,713 B2 | 5/2008 | Swann et al. |
| 7,611,286 B2 | 11/2009 | Swann et al. |
| 7,682,084 B2 * | 3/2010 | Yoshimura et al. ........ 384/306 |
| 7,845,855 B2 | 12/2010 | Bischof et al. |
| 2003/0021503 A1 * | 1/2003 | Branagan ............ 384/303 |
| 2003/0153419 A1 | 8/2003 | Hodjat et al. |
| 2005/0047690 A1 * | 3/2005 | Keramati et al. ........ 384/368 |
| 2006/0078239 A1 | 4/2006 | Dimofte |
| 2008/0131039 A1 | 6/2008 | New |
| 2008/0131042 A1 | 6/2008 | New |
| 2008/0253706 A1 | 10/2008 | Bischof et al. |
| 2010/0310201 A1 | 12/2010 | Zeidan |
| 2011/0188789 A1 | 8/2011 | Bischof et al. |

FOREIGN PATENT DOCUMENTS

| | | | |
|---|---|---|---|
| JP | 57000042 A | * | 1/1982 |
| JP | 60252186 A | * | 12/1985 |
| JP | 61184805 A | | 8/1986 |
| JP | 03149411 A | * | 6/1991 |
| JP | 6023672 A | | 2/1994 |
| JP | 6323505 A | | 11/1994 |
| JP | 09303382 A | * | 11/1997 |
| JP | 11351243 A | * | 12/1999 |
| JP | 2003232339 A | * | 8/2003 |
| RU | 2038516 C1 | | 6/1995 |

* cited by examiner

BI-DIRECTIONAL ROTATION OFFSET PIVOT THRUST BEARING

CROSS REFERENCE TO RELATED APPLICATION

This application is related to and claims priority from earlier filed provisional patent application Ser. No. 61/217,989, filed Jun. 8, 2009, the entire contents thereof is incorporated herein by reference.

BACKGROUND OF THE INVENTION

The invention relates generally to bearings and, more particularly, bi-directional tilting pad thrust bearings arrangements.

Rotational bearings are very well known in the art to provide an interface between a rotating structure and a contact surface. It is common to employ some type of pad or pads at the interface to optimize the interconnection between the bearing and the rotating structure and to transmit axial thrust forces.

Load capacity is highly dependent on the pad interface in a bearing. It has been found that the interface can be further optimized, for better transmission of axial thrust forces, by tilting the pads of a bearing to reduce the amount of friction. Such increasing load capacity by reduced friction is achieved by controlled hydroplaning. Such tilting pad thrust bearing arrangements are well known in the art. Typically, such tilting pads arrangements include an array of fixed pads that are all tilted in a given rotational direction, such as a forward rotational direction. This is advantageous in that hydroplaning can be achieved.

It is also known that offsetting the tilt of the thrust pads can further optimize bearing performance. For example, offsetting the pivot angle of the thrust pad desirably increases load capacity as seen in the graph of FIG. 9. Studies have found that offset pivoting pads in the direction of rotation can generate, for example, 50-100 percent additional load capacity for the thrust bearing. Therefore, it is highly desirable to offset the pivot tilt of a thrust bearing.

A serious drawback of tilted or angled pad thrust bearing arrangements is that while rotation in the forward direction is highly optimized, rotation in the reverse direction is extremely inefficient as the tilted pads are only optimized in the forward direction. However, since reverse directional rotation is frequently needed in many different bearing environments, there is a need for a thrust bearing that is bi-directional while still providing the optimizing hydroplaning of tilting thrust pads.

There have been many attempts in the prior art to provide a bi-directional thrust bearing with tilting pads. Such bearing includes pads that can rock back and forth about a longitudinal axis that pass through the center axis of rotation of the device. These prior art tilting pads are fixed in place relative to some type of fulcrum, which is either provided on the underside of the pad itself or on some type of carrier on which the pad rests. For example, it is well known in the art to provide a fixed tilting pad that has a 50/50 percent tilt on its leading edge and its trailing edge. When the device is rotated in a forward direction, the pads automatically tilt to provide the desirable hydroplaning and increased load capacity. When the rotation is reversed, the pads automatically tilt in the opposite direction to provide the desired hydroplaning and increased load capacity. In this case, a 50/50 leading edge tilt in both directions is required to ensure equal load capacity in both the forward and reverse directions.

However, it should be noted that the desirable offset tilting is not well-suited in such a bi-directional fixed tilting pad arrangement, as described above. This is because an optimized tilting offset can only be optimized in only one direction, e.g. the forward rotational direction, when the pad is fixed in place. In that case, when the rotation is reversed, the same fixed offset will greatly detrimentally effect load capacity in that reverse direction. Therefore, bi-directional tilting pad thrust bearing arrangements typically cannot use any type of optimized offset tilt and must use a 50/50 fulcrum positioning for equally tilt in both the forward and reverse rotational directions. Therefore, such bearing arrangement must sacrifice the improvements capable from offset tilting in order to make the bearing bi-directional and maintain good load capacity in both rotational directions.

Therefore, it is not possible for a thrust bearing structure to be both bi-directional and optimized with offset tilt in both the forward and reverse directions at the same time.

In view of the foregoing, there is a demand for thrust bearing arrangement to have an optimized bearing surface.

There is a demand for a bearing to have an increased load capacity.

There is a further demand for a single bearing arrangement that can be used for both forward and reverse rotation thereby obviating the need for stocking multiple bearing for multiple rotation directions.

There is a demand for a bearing arrangement that enables rotation of a given device to be reversed without the need for changing the bearing in order to maintain optimal load capacity.

There is a demand for a bearing that is bi-directional.

There is a demand for a bearing that has a rotation offset pivot.

There is yet another demand to provide a bearing that maintains an offset pivot tilt regardless of the direction of rotation of the bearing.

SUMMARY OF THE INVENTION

The present invention preserves the advantages of prior art bi-directional bearings. In addition, it provides new advantages not found in currently available bi-directional bearings and overcomes many disadvantages of such currently available bi-directional bearings.

The invention is generally directed to the novel and unique bi-directional rotation offset pivot thrust bearing. A carrier is provided that has a first side and a second side and an outer peripheral wall. The carrier is preferably circular and has a center axis. An array of longitudinal protrusions is provided, each having a longitudinal axis, on the first side of the circular carrier and oriented with each longitudinal axis running through the center axis of the circular carrier.

An array of thrust pads, such as in a circular array, having a front side and a rear side, are positioned relative to the carrier with the respective rear sides of the thrust pads being in slidable engagement with the longitudinal protrusions on the carrier. The thrust pads are movable, relative to the carrier, between a first rotational position about the center axis of the carrier and a second rotational position about the center axis of the carrier. The thrust pads are offset pivoted in a first direction when in a the first rotational position and offset pivoted in a second direction when in the second rotational position. For example, the thrust pads are offset pivoted in an approximate 60 percent to 40 percent ratio with the leading side of the thrust pad being 60 percent in both the first rotational position and the second rotational position. The thrust pads, respectively, travel from one protrusion to an adjacent protrusion when moving between the first rotational position to the second rotational position and from the second rotational position to the first rotational position.

A retainer is also preferably provided to maintain the thrust pads in a circular array and in spaced apart relation over the respective protrusions disposed thereunder. The retainer may include a slot in its side wall to slidably receive an outwardly emanating pin from the side wall of the carrier to define the first rotational position and the second rotational position of the thrust pads.

The thrust pads are automatically moved to the first rotational position when the carrier is rotated in a counterclockwise direction and the thrust pads are automatically moved to a second rotational position when the carrier is rotated in a clockwise direction. As a result, the front sides of the thrust pads provided an optimized bearing surface.

It is therefore an object of the present invention to provide a bearing that has an optimized bearing surface.

Another object of the present invention is to provide a bearing that has increased load capacity.

An object of the present invention is to provide a bearing that enables a single bearing arrangement to be used for both forward and reverse rotation thereby obviating the need for stocking multiple bearing for multiple rotation directions.

Another object of the present invention is to provide a bearing that enables rotation of a given device to be reversed without the need for changing the bearing in order to maintain optimal load capacity.

A further object of the present invention is to provide a bearing that is bi-directional.

Another object of the present invention is to provide a bearing that has a rotation offset pivot tilt.

Yet another object of the present invention is to provide a bearing that maintains an offset pivot tilt regardless of the direction of rotation of the bearing.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
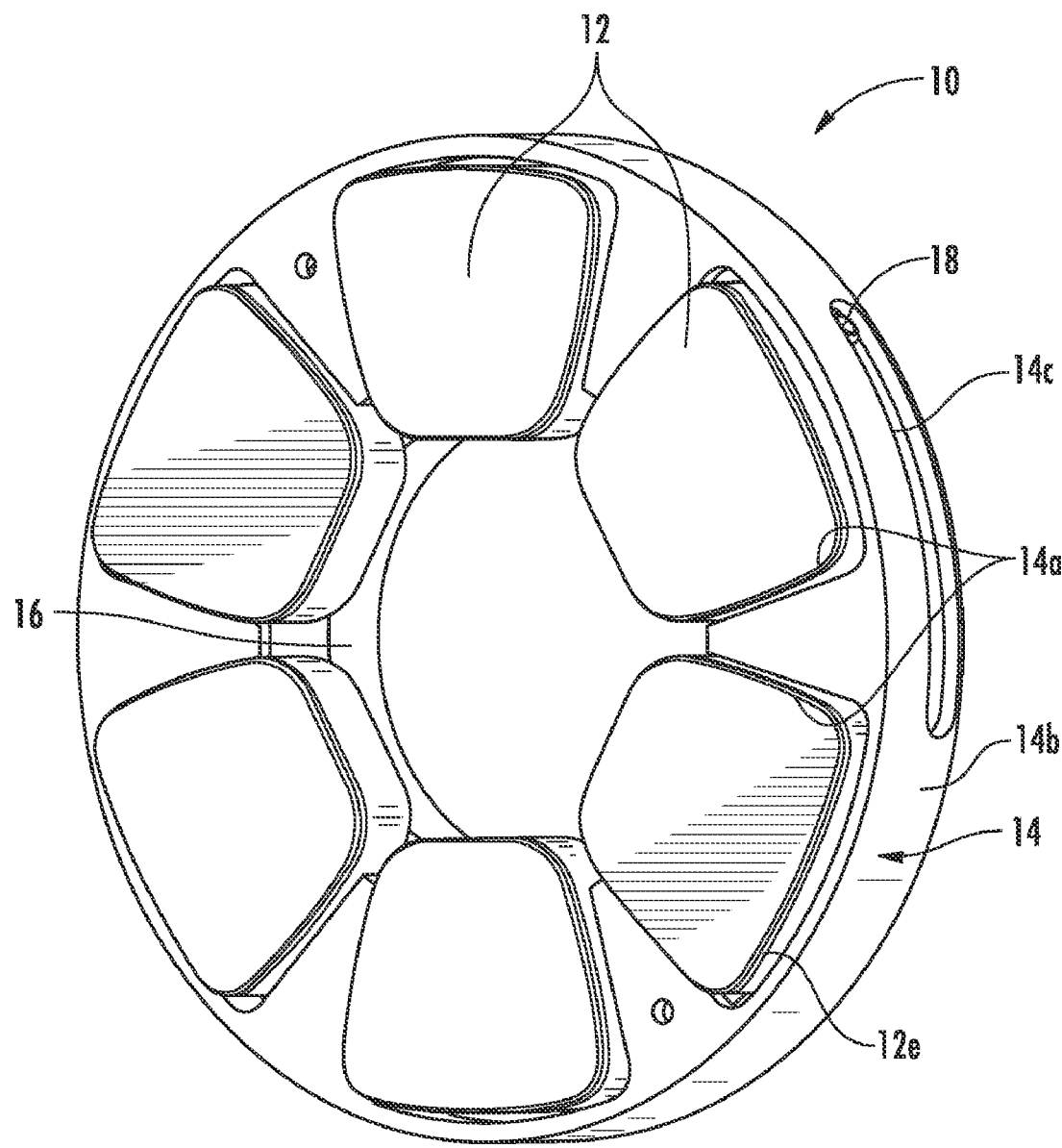
FIG. 1 is a front perspective view of the bi-directional rotation offset pivot thrust bearing in accordance with the present invention.
Figure 2:
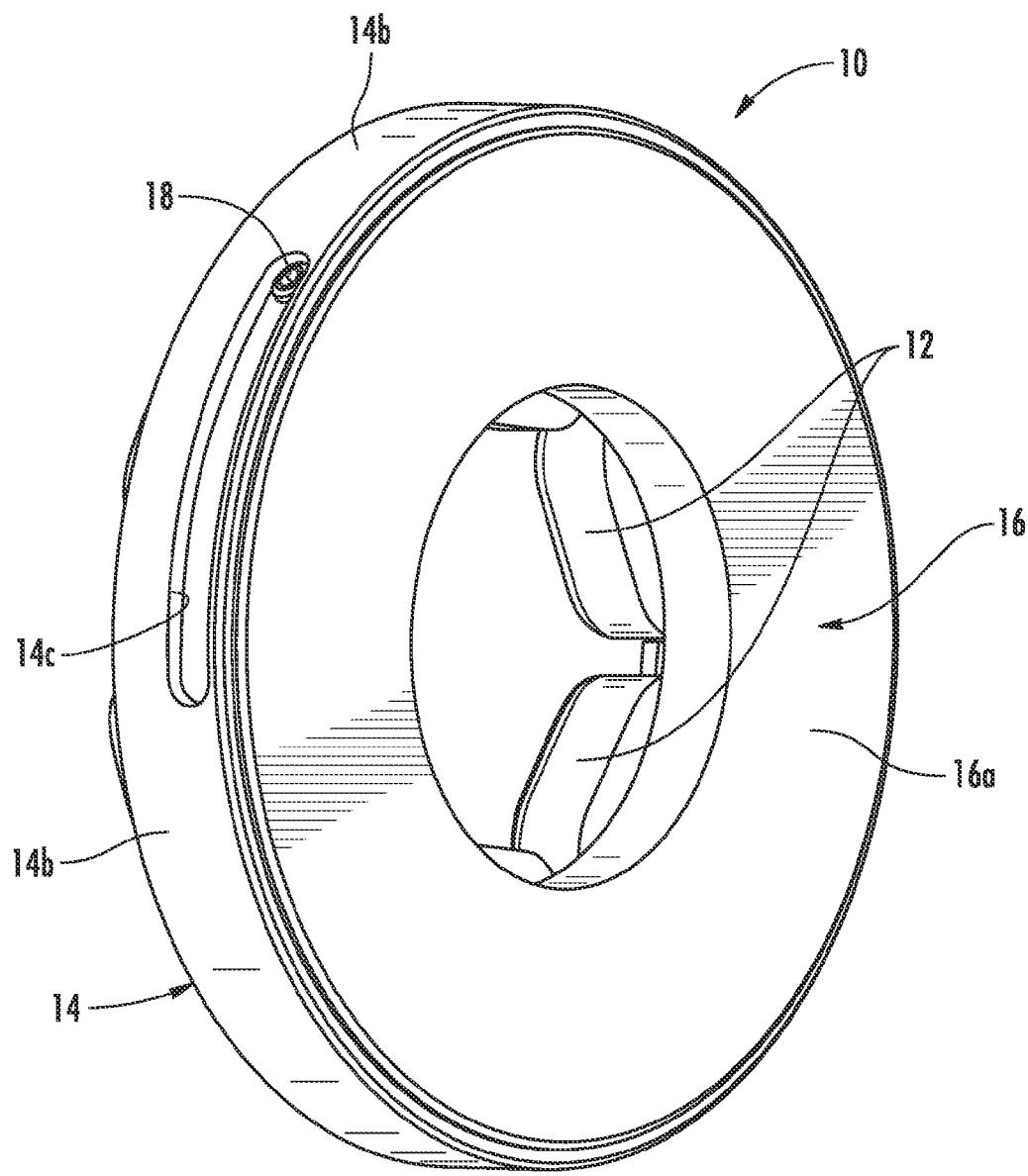
FIG. 2 is a rear perspective view of the thrust bearing of FIG. 1.

Turning first to FIGS. 1 and 2, a bi-directional rotation offset pivot thrust bearing 10 is shown. FIG. 1 shows a front perspective view of the present invention while FIG. 2 shows a rear perspective view thereof. The bearing 10 includes an array of pads 12 that are loosely retained by an outer retainer 14 into engagement with a carrier 16. The pads 12 reside within seats 14a in the retainer 14. The pads 12 may further carry additional layer or coatings 12e thereon, which are dependent on the application and needs for the bearing 10. The pads are shown with a general trapezoidal shape; however, any shape may be used to meet the requirements of the bearing 10.

Figure 3:
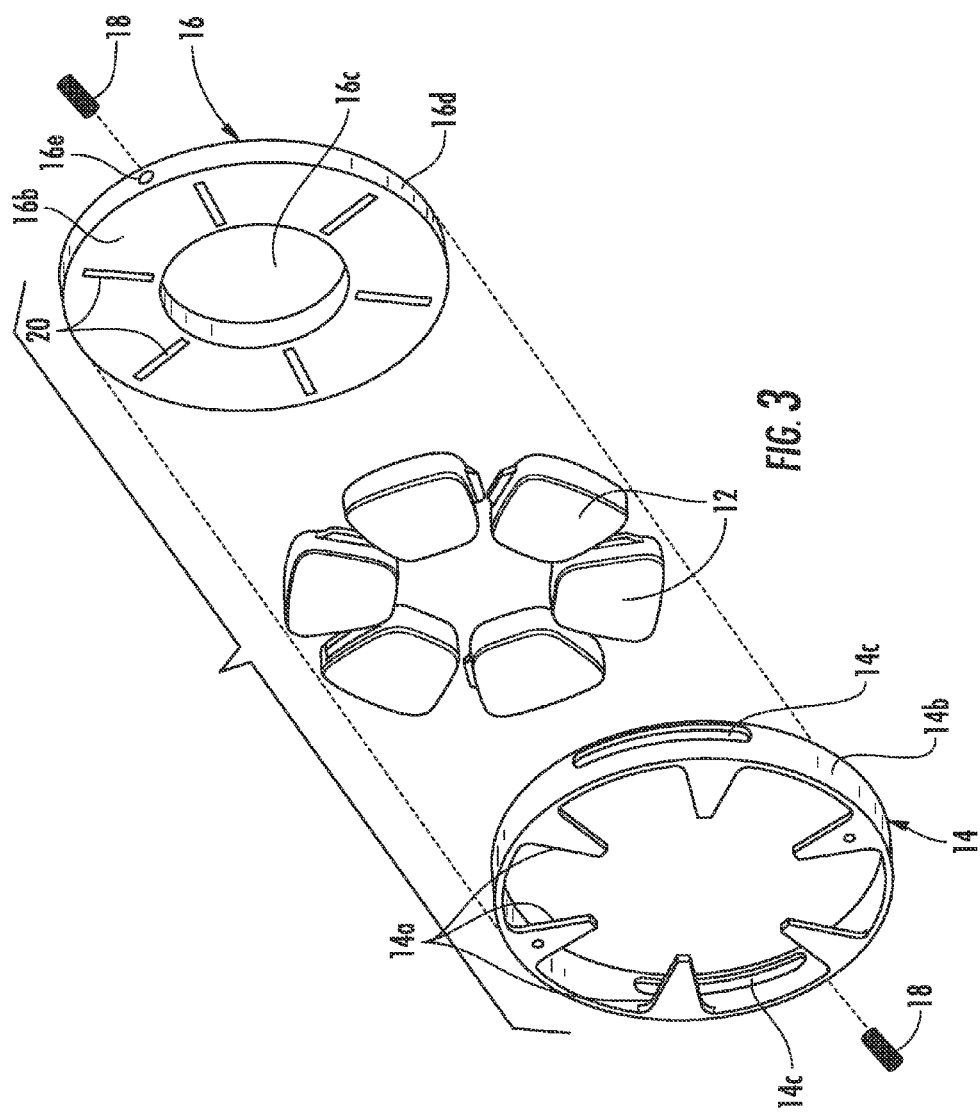
FIG. 3 is a front exploded perspective view of the thrust bearing of FIG. 1.

As will be discussed in detail below, the retainer 14 and carrier 16 are preferably rotationally connected to each other in some fashion to define the extent of travel of the pads 12 over the carrier 16. In the preferred embodiment shown in FIGS. 1 and 2, a pin 18 is connected to the carrier 16 and is routed through a slot 14c in a side wall 14b of the retainer 14. On the opposing side of the assembly 10, another pin 18 and slot 14c arrangement is provided but cannot be seen in FIG. 2. This is best seen in FIG. 3. The pads 12 respectively reside in seats 14a in the retainer 14 with movement of the retainer 14 resulting in movement of the pads 12. The pads 12 emanate above the retainer a distance, dependent on the needs and requirements of the bearing 10, so that the pads 12 may effectively provide the needed frictional reduction and bearing function.

Limitation of movement of the retainer 14 relative to the carrier 16 also results in control of movement of the pads 12. It should be understood that the pin 18 and slot 14c construction shown in FIGS. 1 and 2 are just one of many structures that can be employed to control the rotational travel of the pads 12 relative to the carrier 16. As will be described below, the travel of the pads 12 relative to the carrier 16 is important, as the direction of tilting of the pads 12 will be dependent on the position of the pads 12 relative to the carrier 16.

FIG. 2 shows the rear side of the thrust bearing assembly 10. It should be understood that this bearing 10 might be attached, via the back surface 16a of the carrier 16, to any surface that requires such a rotational bearing. For example, the carrier 16 may be bolted, or otherwise secured, to a drill assembly or other piece of equipment (not shown). The bearing assembly 10 may be positioned within a gear box, for example, and filled with oil or other lubricant (not shown). The interaction of the lubricant with the tilting pads 12 achieves the desired hydroplaning for increased load capacity of the bearing assembly 10.

Figure 4:
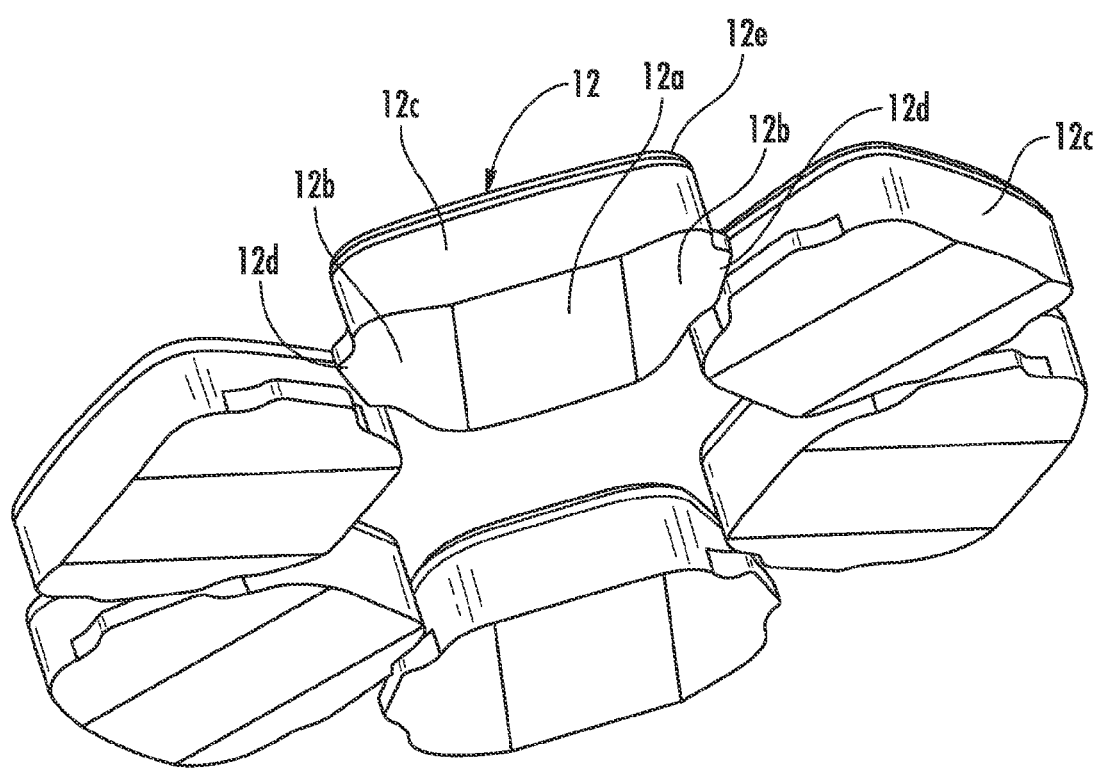
FIG. 4 is a rear perspective view of the thrust pads of the bearing of FIG. 1.

Turning now to FIGS. 3 and 4, further details of the bearing assembly of the present invention is shown. The carrier 16 is preferably circular in configuration and preferably includes a center aperture 16c but may not include such an aperture 16c depending on the installation environment. An array of longitudinal upstanding protrusions 20 is provided on the top surface 16b of the carrier 16. These protrusions 20 are located about the periphery of the carrier 16 and are oriented on an axis that passes through the center rotational axis of the carrier 16. The profile of the protrusions may be rounded or squared off depending on the application and the desired tilting performance of the pads. Also, the protrusions 20 may be of any height that is suitable to tilt the pads, as desired. For example, the protrusions 20, for example, can be of a height of a few thousands of an inch and of a length of that is anywhere from 90% of the pad radial length to a very short length making it effectively a point pivot. Essentially, the protrusions 20 can be of any size or configuration to meet the requirements of the bearing, namely, the desired tilting of the pads 12. They can be inserted into the carrier 16 or machined directly therein. This is in stark contrast to the prior art where the pivot fulcrum is machined directly into the back of the pads, thereby making the pivot action thereof fixed. Any number of protrusions 20 can be used to suit the size of the given application. In the example shown in the figures, six protrusions 20 are used, by way of example.

An array of thrust pads 12 is provided about the periphery of the carrier 16. Preferably, the same number of thrust pads 12 is used as the number of protrusions 20 so at a given point, each pad 12 has corresponding protrusion 20 to effectuate tilting. As will be shown and described below, a single protrusion 20 corresponds with a given pad 12 to cause it to tilt in a given direction. When the direction of rotation is reversed, a different protrusion 20 is employed to tilt that pad 12 in the opposite reverse direction. The bottom sides of the thrust pads 12 are best seen in FIG. 4. As can be seen the pads 12 include an interface surface 12a to contact the protrusions 20 to provide the offset tilt in accordance with the present invention. The pads 12 also include angled side surfaces 12b to facilitate riding of the pads 12 from protrusion 20 to protrusion 20 when rotation of the bearing 10 is reversed and movement of the fulcrum, provided by the protrusions 20, is required to maintain an optimal offset tilt regardless of the direction of rotation of the bearing 10.

Referring back to FIG. 3, the retainer 14 is shown to include an array of seats 14a that are configured to loosely receive the thrust pads 12 therein. It is preferred that the retainer include the same number of seats 14a as the pads 12 and protrusions 20. The thrust pads 20 are routed up into the retainer 14 from below so that the side walls 12c of the thrust pads 12 are bounded by the inside edges of the seats 14a so that the pads 12 stay generally aligned and in place. Each of the pads 12 include a pair of locking tabs 12d to ensure that they are captured between the retainer 14 and the top surface 16b of the carrier 16. The tabs 12d are a preferred structure for this purpose although other structures may be used. The locking tabs 12d enable the pads 12 to freely tilt within the retainer 14 when the interface surface 12a of the pads 12 are in contact with respective protrusions 20 on the top surface 16b of the carrier 16.

The retainer 14 also includes a downwardly depending side wall 14b that embraces the outer peripheral edge wall 16d of the carrier 16. The side wall 14b of the retainer 14 preferably includes at least one, such as two or more, peripherally running slots 14c that receive respective pins 18 that are connected to the peripheral edge wall 16d of the carrier 16. The figures show, by way of example, two opposing pin 18 and slot 14c arrangements. In this case, by way of example, the pins 18 are a male threaded bolts respectively received in a female threaded bores 16d on the peripheral edge wall 16d of the carrier 16. The pin 18 and slot 14c arrangements are preferably provided on both sides of the bearing 10 to ensure a balanced locking structure. This is merely one example of how the retainer 14 can be rotationally secured to the carrier 16. For example, it is possible for the locking structure to be reversed where slots are provided through the carrier 16 to receive pins attached to the retainer 14. Thus, as best seen in FIG. 3, the retainer 14 is secured to the carrier 16 by the pins 18 and slots 14c arrangement with the pads 12 captured therebetween.

Figure 5:
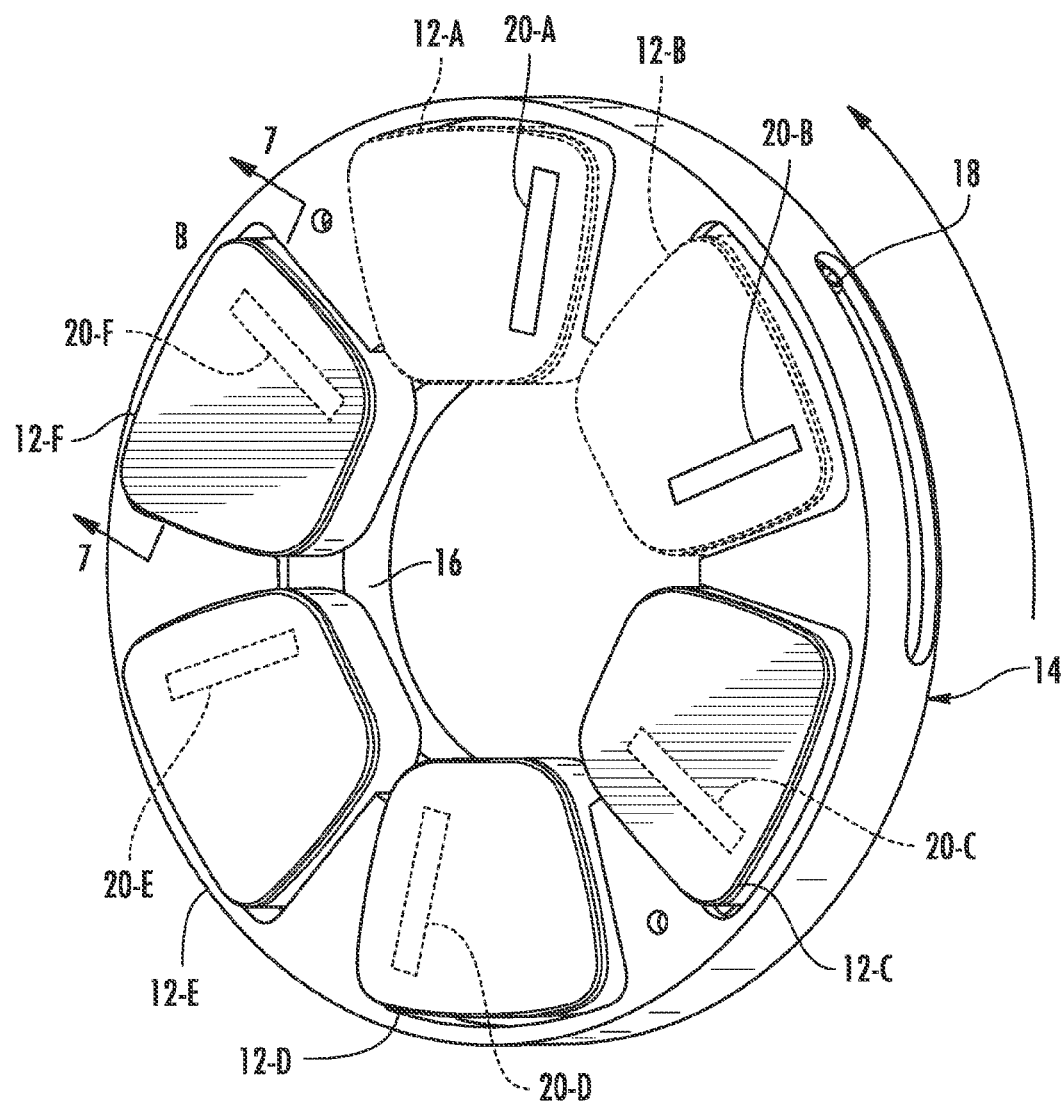
FIG. 5 is a front perspective view of the thrust bearing of FIG. 1 with thrust pad retainer in a clockwise rotated position with two thrust pads removed for illustration purposes.
Figure 6:
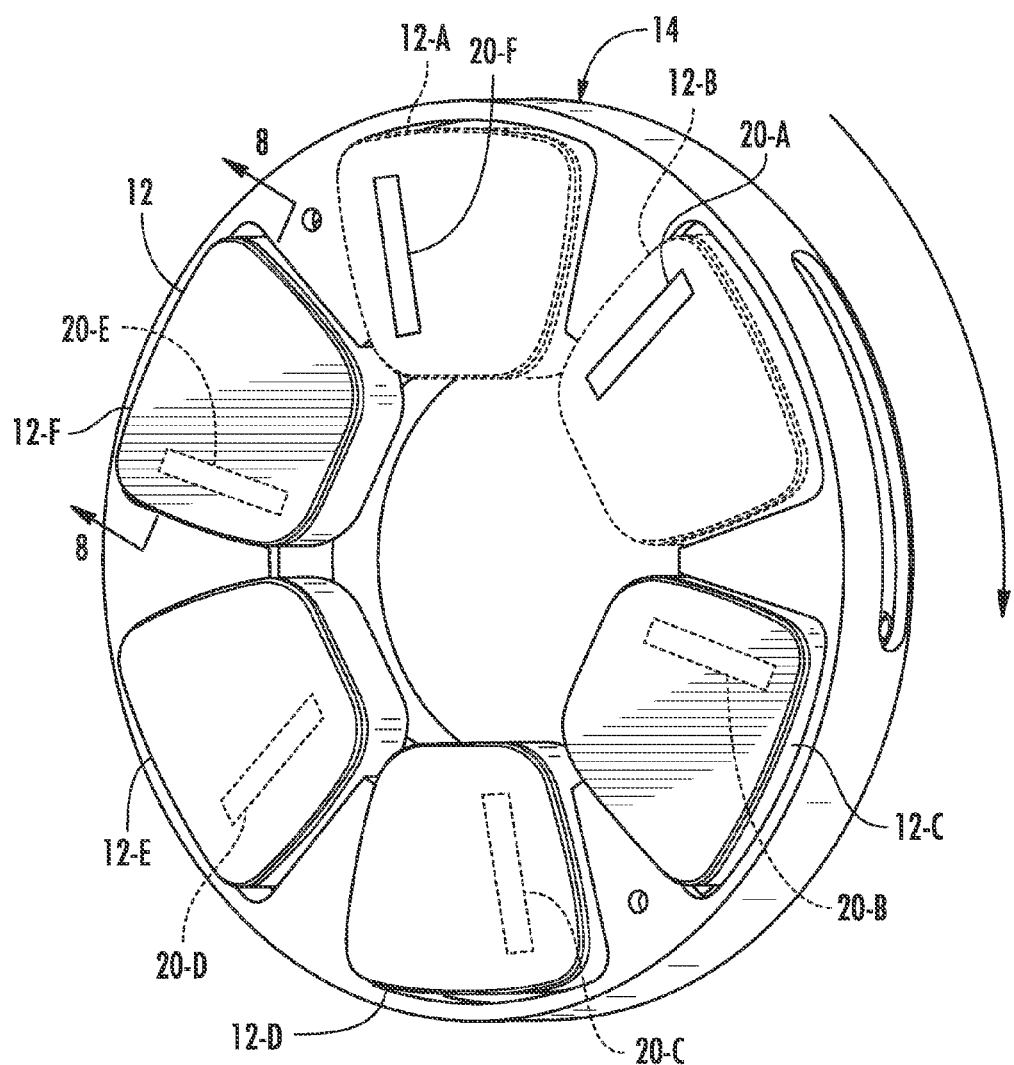
FIG. 6 is a front perspective view of the thrust bearing of FIG. 1 with thrust pad retainer in a counterclockwise rotated position with two thrust pads removed for illustration purposes.
Figure 7:
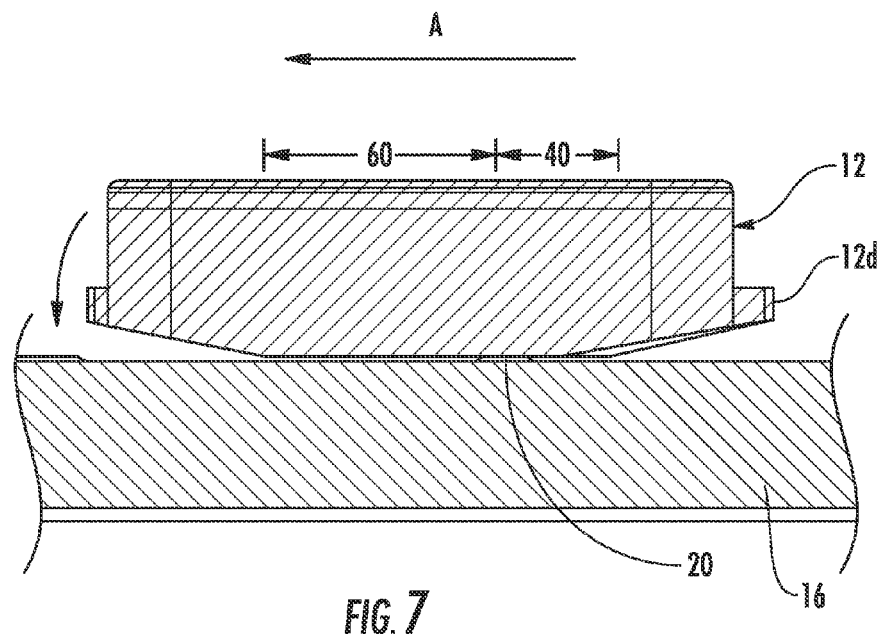
FIG. 7 is a cross-sectional view through the line 7-7 of FIG. 5.
Figure 8:
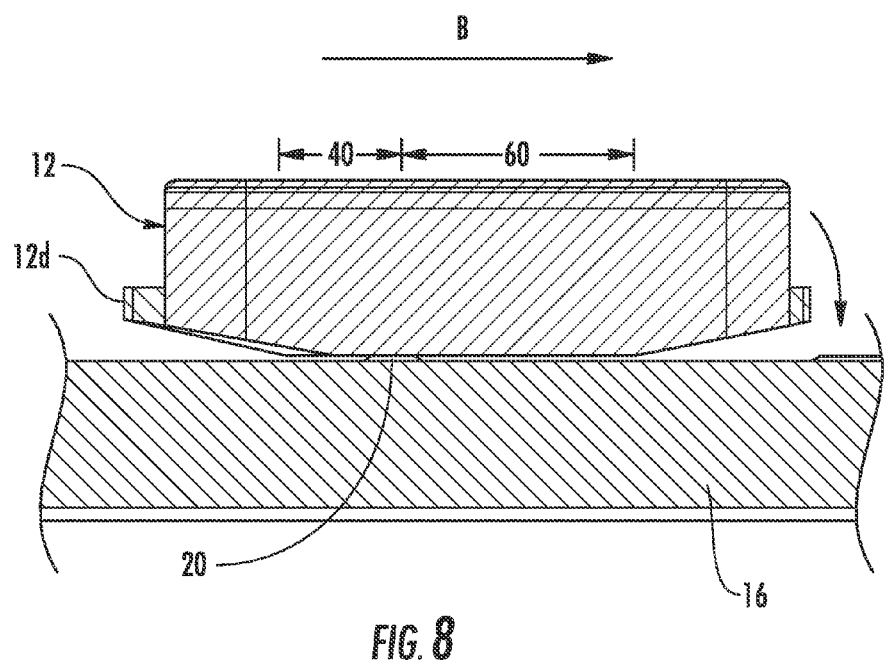
FIG. 8 is a cross-sectional view through the line 8-8 of FIGS. 6.
Figure 9:
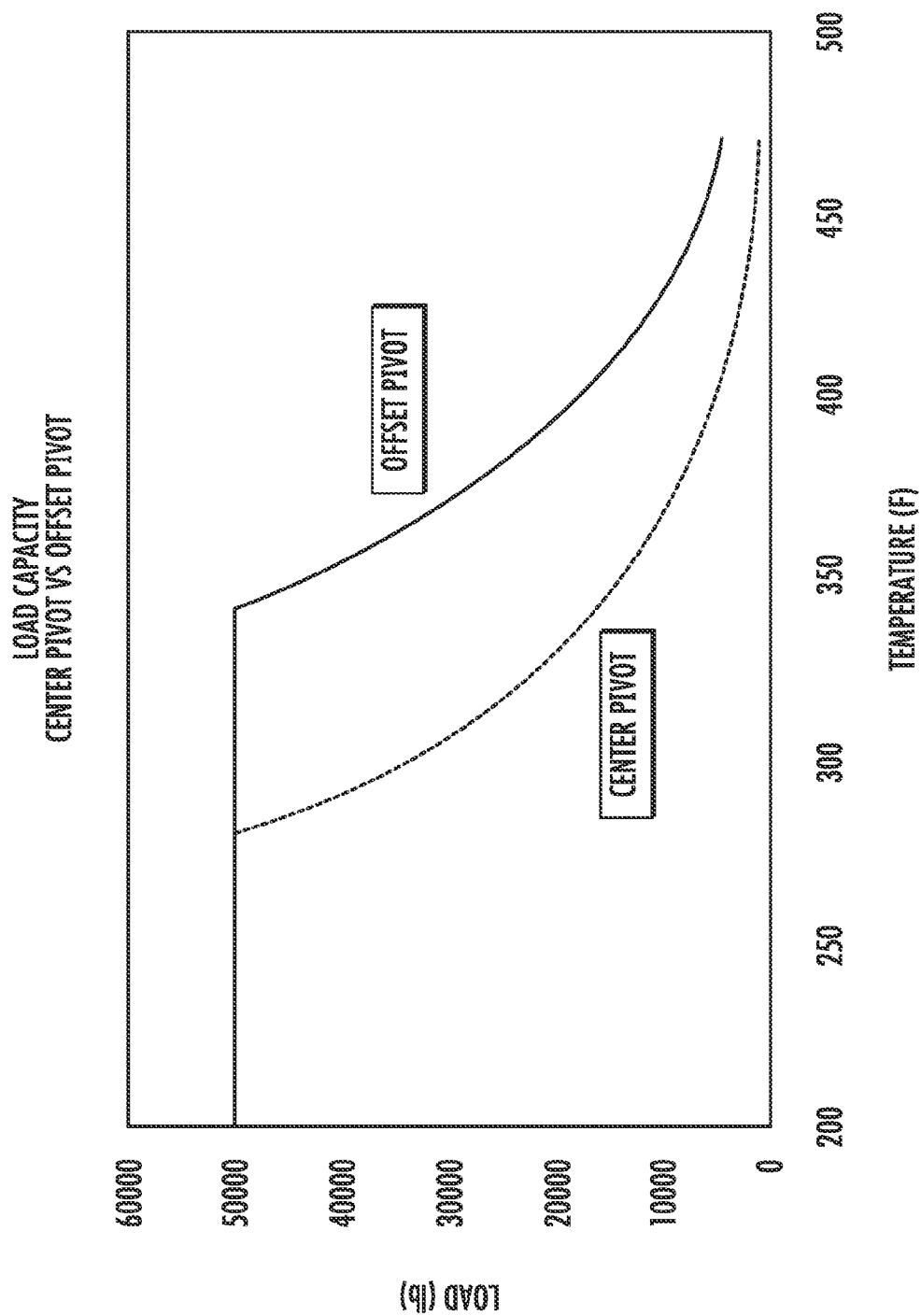
FIG. 9 is a graph illustrating the load capacity of a bearing with pads having a center pivot versus the load capacity of a bearing having pads with an offset pivot.

FIGS. 5-8 illustrate operation of the bi-directional bearing 10 of the present invention that can provide offset pivot thrust bearing 10 in both the forward and reverse rotational directions. FIGS. 5 and 7 illustrate the present invention when operating in a first rotational direction, called a "forward" direction for reference purposes only. It should be noted that the term "forward" is relative to the application to be carried out by the device that employs the bearing 10. FIGS. 6 and 8 illustrate the present invention when operating in a second rotational direction, which may be called a "reverse" direction for reference purposes only. Also, FIGS. 5 and 6 have two pads 12 shown in broken lines for ease of discussion so the interaction of the protrusions 20 to the pads 12 may be easily seen.

In FIG. 5, the carrier 16 is rotated in a counterclockwise fashion representing a "forward" rotation of a device (not shown) connected thereto. Rotation of the carrier 16 causes the pins 18, connected to the edge wall 16d of the carrier 16, travels within the respective slots 14c in the side walls 14b of the retainer 14. A stop is provided when the pin 18 reaches the end of the slot 14c. In FIG. 5, only one pin 18 and slot 14c arrangement can be seen but it should be understood that the structure is the same for the other pin 18 and slot 14c arrangement on the opposing side of the bearing 10. As a result, the retainer 14 and the pads 12 residing in the seats 14a rotate in a relative clockwise direction until the pins 18 reach the end of their travel in the respective slots 14c. FIG. 5 shows the end of the travel of the pins 18 within the slots 14c. Further counterclockwise rotation of the carrier 16 results in the retainer 14 and the pads 12 therein to now also move counterclockwise. This results in the pads 12-A through 12-F being located over their respective protrusions 20-A through 20-F, which serve as respective tilt fulcrum.

As can be readily seen in FIG. 5, the positioning of the pins 18 in the slots 14c causes the pads 12-A through 12-F to situate over protrusions 20-A through 20-F, respectively, whereby an offset tilt is provided. FIG. 7 shows a cross-sectional view through the line 7-7 of FIG. 5 to illustrate the offset nature of the pad tilt achieved by the present invention. More specifically, the protrusions 20 are located under the right side of the pad 12 thereby causing the pad 12 to tilt down to the left when the carrier 16 is rotating in the counterclockwise forward direction A. In this case, it is preferred that the pad tilt forward is in a ratio of 60 to 40 percent where the leading edge/side is 60 percent and the trailing edge/side is 40 percent. Thus, when the carrier 16 rotates in direction A, the leading 60 percent side will tilt downwardly to optimally increase load capacity.

The bearing 10 of the present invention uniquely can switch rotational direction and still provide an offset tilt of the pads 12 for optimal bearing performance. This can be seen in conjunction with FIGS. 6 and 8. In FIG. 6, the rotation of the carrier 16 is now switched from a "forward" counterclockwise direction to a "reverse" clockwise direction. Rotation of the carrier 16 causes the pins 18 in the respective slots 14c to move to the opposite end thereof, as seen in FIG. 6. A stop is provided when the pin 18 reaches this other end of the slot 14c (at the bottom of the slot 14c as in FIG. 6). Further rotation of the carrier 16 causes the pads 12-A through 12-F and the retainer 14 to also move in a clockwise fashion. The movement of the pins 18 in their respective slots 14c corresponds with the movement of the pads 12-A through 12-F over the protrusions 20-A through 20-F on the carrier 16. More specifically, controlled partial rotation of the pads 12 over the protrusions 20 causes the protrusions to migrate to a neighboring pad 12 to the right. For example, in FIG. 6, protrusion 20-A has now migrated to be under pad 12-B. Other protrusions 20 have similarly shifted.

As can be seen in FIGS. 6 and 8, the carrier 16 rotates in (reverse) direction B that is less than the number of pads 12 (and protrusions 20) divided into 360 degrees. For example, in the embodiment shown in the figures, six pads 12 and six corresponding protrusions 20 are spaced approximately 60 degrees apart from one another. However, the amount of rotation required, as controlled by the pins 18 in the slots 14c, is less than 60 degrees because an offset tilt is desired in both directions. Therefore, protrusions 20 must be located on the respective right sides of the pads 12 in FIGS. 5 and 7 but needs to only travel to the left side of the neighboring pads when the direction of rotation is reversed as in FIGS. 6 and 8. This amount of rotation is preferably 360/number of pads minus twice the optimum offset angle, which would be 50 degrees in this specific case for a 60/40 offset tilt but could be modified to suit the application at hand. For example, in FIG. 5, the pads 12-A through 12-F are located over their respective pads 20-A through 20-F to provide the required 60/40 tilt down to the left, as seen in FIG. 7. When the carrier 16 is rotated clockwise under the pads 12, the protrusions shift to a neighboring pad 12. More specifically, as in FIG. 6, protrusion 20-A shifts to reside under pad 12-B; protrusion 20-B shifts to reside under pad 12-C; protrusion 20-C shifts to reside under pad 12-D; protrusion 20-D shifts to reside under pad 12-E; protrusion 20-E shifts to reside under pad 12-F and protrusion 20-F shifts to reside under pad 12-A. The shifted position in FIG. 6 is at the left side of the pad to induce a 60/40 or whatever happens to be the optimum ratio for tilt down to the right, as seen in FIG. 8, which is now the leading edge/side of the bearing because it is now rotating in reverse. This shifting automatically occurs based on the rotational direction of the carrier 16.

The size and configuration of the bearing 10 may be modified to suit the installation.

In view of the foregoing, the present invention enables a bi-directional thrust bearing 10 to have an offset tilt in both the forward and reverse rotational directions of the carrier 16. The controlling "slip" of the thrust pads 12 relative to the protrusions 20 on the carrier 20 by, for example, the pins 18 and slots 14c arrangement enables the pivot fulcrums formed by the protrusions 20 under the pads 12 to be automatically shifted to the proper location underneath the pads 12 for optimal tilt. This automatically achieves increased load capacity in both the forward and reverse rotational directions.

It would be appreciated by those skilled in the art that various changes and modifications can be made to the illustrated embodiments without departing from the spirit of the present invention. All such modifications and changes are intended to be covered by the appended claims.

What is claimed is:

1. A bi-directional rotation offset pivot thrust bearing, comprising:
   a. a carrier having a first side and a second side and an outer peripheral wall; the carrier being circular and having a center axis;
   b. an array of longitudinal protrusions, each having a longitudinal axis, being positioned on the first side of the circular carrier and oriented with each longitudinal axis running through the center axis of the circular carrier, wherein each protrusion is rigidly affixed to the carrier; and
   c. a plurality of thrust pads in a circular array, having a front side and a rear side; the respective rear sides of the plurality of thrust pads being in slidable engagement with the longitudinal protrusions; the plurality of thrust pads being movable, relative to the carrier, between a first rotational position about the center axis of the carrier and a second rotational position about the center axis of the carrier; the thrust pads being offset pivoted in a first direction when in a the first rotational position and offset pivoted in a second direction when in the second rotational position.

2. The thrust bearing of claim 1, further comprising: a retainer, having a plurality of seats corresponding to each of the thrust pads; the thrust pads respectively residing in the plurality of seats; the retainer having a side wall and maintaining the thrust pads in a circular array.

3. The thrust bearing of claim 2, wherein the retainer in includes a slot in the side wall and the carrier includes a pin outwardly emanating from the side wall that travels within the slot in the retainer from a first end location to a second end location; the first end location defining the first rotational position and the second end location defining the second rotational position of the thrust pads.

4. The thrust bearing of claim 2, wherein the thrust pads each respectively include a plurality of outwardly emanating tabs that engage with the retainer.

5. The thrust bearing of claim 1, wherein the thrust pads are offset pivoted in an approximate 60 percent to 40 percent ratio with the leading side of the thrust pad being 60 percent in both the first rotational position and the second rotational position; the front sides of the thrust pads thereby providing an optimized bearing surface.

6. The thrust being of claim 1, wherein the thrust pads are automatically moved to the first rotational position when the carrier is rotated in a counterclockwise direction and the thrust pads are automatically moved to a second rotational position when the carrier is rotated in a clockwise direction.

7. The thrust bearing of claim 1, wherein each of the plurality of thrust pads, respectively, travel from one protrusion to an adjacent protrusion when moving between the first rotational position to the second rotational position and from the second rotational position to the first rotational position.

8. A bi-directional rotation offset pivot thrust bearing, comprising:
   a. a carrier having a first side and a second side and an outer peripheral wall;
   b. an array of protrusions positioned on the first side of the carrier, wherein each protrusion is rigidly affixed to the carrier; and
   c. a plurality of thrust pads, having a front side and a rear side; the respective rear sides of the plurality of thrust pads being in slidable engagement with the protrusions; the plurality of thrust pads being movable, relative to the carrier, between a first position and a second position; the thrust pads being offset pivoted in a first direction when in a the first position and offset pivoted in a second direction when in the second position.

9. The thrust bearing of claim 8, further comprising: a retainer, having a plurality of seats corresponding to each of the thrust pads; the thrust pads respectively residing in the plurality of seats; the retainer having a side wall and maintaining the thrust pads in an array.

10. The thrust bearing of claim 9, wherein the retainer in includes a slot in the side wall and the carrier includes a pin outwardly emanating from the side wall that travels within the slot in the retainer from a first end location to a second end location; the first end location defining the first position and the second end location defining the second position of the thrust pads.

11. The thrust bearing of claim 9, wherein the thrust pads each respectively include a plurality of outwardly emanating tabs that engage with the retainer.

12. The thrust bearing of claim 8, wherein the thrust pads are offset pivoted in an approximate 60 percent to 40 percent ratio with the leading side of the thrust pad being 60 percent in both the first rotational position and the second rotational position; the front sides of the thrust pads thereby providing an optimized bearing surface.

13. The thrust being of claim 8, wherein the thrust pads are automatically moved to the first rotational position when the carrier is moved in a first direction and the thrust pads are automatically moved to a second position when the carrier is moved in a second direction.

14. The thrust bearing of claim 8, wherein each of the plurality of thrust pads, respectively, travel from one protrusion to an adjacent protrusion when moving between the first position to the second position and from the second position to the first position.

15. A bi-directional rotation offset pivot thrust bearing, comprising:

a. a carrier having a first side and a second side and an outer peripheral wall, wherein said carrier is circular in shape and has a central axis;

b. a plurality of protrusions affixed to said first side of said carrier, wherein each said protrusion includes a longitudinal axis, wherein each said protrusion is oriented such that each said longitudinal axis intersects said center axis of said circular carrier; and c. a plurality of thrust pads having an interface surface and a front surface, wherein said interface surface of a first said thrust pad is positioned adjacent a first said protrusion such that said first thrust pad is offset pivoted in a first direction, wherein said interface surface of said first thrust pad is slideable with respect to said first protrusion such that said interface surface of said first thrust pad may be positioned adjacent a second said protrusion such that said first thrust pad is offset pivoted in a second direction.

\* \* \* \* \*